United States Patent
Shim

(10) Patent No.: US 9,164,276 B2
(45) Date of Patent: *Oct. 20, 2015

(54) MICRO OPTICAL SWITCHING DEVICE, IMAGE DISPLAY APPARATUS INCLUDING MICRO OPTICAL SWITCHING DEVICE, AND METHOD OF MANUFACTURING MICRO OPTICAL SWITCHING DEVICE

(71) Applicant: SAMSUNG ELECTRONICS CO., LTD., Suwon-si (KR)

(72) Inventor: Dong-sik Shim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

This patent is subject to a terminal disclaimer.

(21) Appl. No.: 13/912,719

(22) Filed: Jun. 7, 2013

(65) Prior Publication Data

US 2013/0329271 A1   Dec. 12, 2013

(30) Foreign Application Priority Data

Jun. 7, 2012  (KR) .......................... 10-2012-0061080

(51) Int. Cl.
  *G02B 26/02*  (2006.01)
(52) U.S. Cl.
  CPC ...................................... *G02B 26/02* (2013.01)
(58) Field of Classification Search
  None
  See application file for complete search history.

(56) References Cited

U.S. PATENT DOCUMENTS

| | | |
|---|---|---|
| 7,271,945 B2 | 9/2007 | Hagood et al. |
| 7,304,785 B2 | 12/2007 | Hagood et al. |
| 7,304,786 B2 | 12/2007 | Hagood et al. |
| 7,365,897 B2 | 4/2008 | Hagood et al. |
| 7,391,552 B2 | 6/2008 | Barton et al. |
| 7,405,852 B2 | 7/2008 | Brosnihan et al. |
| 7,417,782 B2 | 8/2008 | Hagood et al. |
| 7,460,290 B2 | 12/2008 | Hagood, IV et al. |
| 7,502,159 B2 | 3/2009 | Hagood, IV et al. |
| 7,551,344 B2 | 6/2009 | Hagood et al. |
| 7,616,368 B2 | 11/2009 | Hagood, IV |
| 7,619,806 B2 | 11/2009 | Hagood, IV et al. |
| 7,636,189 B2 | 12/2009 | Hagood, IV et al. |
| 7,675,665 B2 | 3/2010 | Hagood et al. |
| 7,729,037 B2 | 6/2010 | Hagood, IV et al. |
| 7,742,016 B2 | 6/2010 | Hagood et al. |
| 7,742,215 B2 | 6/2010 | Hagood, IV |
| 7,746,529 B2 | 6/2010 | Hagood et al. |
| 7,755,582 B2 | 7/2010 | Hagood et al. |
| 7,839,356 B2 | 11/2010 | Hagood et al. |

(Continued)

FOREIGN PATENT DOCUMENTS

| | | |
|---|---|---|
| KR | 1020050043174 A | 5/2005 |
| KR | 1020060014404 A | 2/2006 |

(Continued)

*Primary Examiner* — Jennifer L. Doak
(74) *Attorney, Agent, or Firm* — Sughrue Mion, PLLC

(57) ABSTRACT

A micro optical switching device is provided, including a substrate, a first electrode disposed on a first surface of the substrate and including a first opening array including having a first plurality of openings, a second electrode disposed over the first electrode and including a second opening array including a plurality of second openings which do not overlap with the plurality of first openings, and a support member disposed on the substrate. The support member has a thickness greater than a distance from the first surface of the substrate to the second electrode and protrudes above the second electrode.

21 Claims, 13 Drawing Sheets

(56) References Cited

U.S. PATENT DOCUMENTS

| | | |
|---|---|---|
| 7,852,546 B2 | 12/2010 | Fijol et al. |
| 7,876,489 B2 | 1/2011 | Gandhi et al. |
| 7,898,714 B2 | 3/2011 | Hagood, IV et al. |
| 7,920,317 B2 | 4/2011 | Lee et al. |
| 7,927,654 B2 | 4/2011 | Hagood et al. |
| 7,999,994 B2 | 8/2011 | Hagood, IV et al. |
| 2008/0062500 A1* | 3/2008 | Hagood, IV ................. 359/230 |
| 2010/0079849 A1* | 4/2010 | Floyd ............................ 359/291 |
| 2010/0315696 A1* | 12/2010 | Lee et al. ...................... 359/290 |
| 2011/0267668 A1 | 11/2011 | Hagood, IV et al. |

FOREIGN PATENT DOCUMENTS

| | | |
|---|---|---|
| KR | 1020070056795 A | 6/2007 |
| KR | 1020110082842 A | 7/2011 |

\* cited by examiner

MICRO OPTICAL SWITCHING DEVICE, IMAGE DISPLAY APPARATUS INCLUDING MICRO OPTICAL SWITCHING DEVICE, AND METHOD OF MANUFACTURING MICRO OPTICAL SWITCHING DEVICE

CROSS-REFERENCE TO RELATED APPLICATION

This application claims the benefit of Korean Patent Application No. 10-2012-0061080, filed on Jun. 7, 2012, in the Korean Intellectual Property Office, the disclosure of which is incorporated herein in its entirety by reference.

BACKGROUND

1. Field

Apparatuses and methods consistent with exemplary embodiments relate to a micro optical switching device, an image display apparatus including the micro optical switching device, and a method of manufacturing the micro optical switching device.

2. Description of the Related Art

Display apparatuses have advanced from conventional cathode ray tubes (CRTs) to flat panel display apparatuses such as liquid crystal displays (LCDs), plasma display panels (PDPs), etc. A CRT display apparatus displays an image when electron beams collide with a fluorescent substance. As the size of a CRT display apparatus increases, a width of the CRT display apparatus increases as well and thus it is difficult to make a large display apparatus. To address this issue, a variety of flat panel display apparatuses have been developed.

In terms of an amount of power consumption of a flat panel display apparatus, although the size of display panels have continuously increased, the optical efficiency of display panels is very low. In particular, as the size of a pixel decreases, optical efficiency sharply decreases. Thus, there is a demand for the development of a micro optical switching device for a display apparatus that may improve optical efficiency with a simple process.

SUMMARY

One or more exemplary embodiments provide a micro optical switching device having a high optical efficiency, and an image display apparatus including the micro optical switching device.

One or more exemplary embodiments provide a micro optical switching device that may be least affected by deformation of a constituent element adjacent to the micro optical switching device, and an image display apparatus including the micro optical switching device.

One or more exemplary embodiments provide a method of manufacturing a micro optical switching device with easy processes.

Additional exemplary aspects will be set forth in part in the description which follows and, in part, will be apparent from the description, or may be learned by practice of the presented embodiments.

According to an aspect of an exemplary embodiment, a micro optical switching device includes a substrate, a first electrode disposed on a first surface of the substrate and including a first opening array including a plurality of first openings, a second electrode disposed over the first electrode and including a second opening array including a plurality of second openings which do not overlap with the plurality of first openings, and a support member disposed on the substrate, having a thickness greater than a distance from the first surface of the substrate to the second electrode, and protruding above the second electrode.

The support member may support the second electrode such that the first electrode and the second electrode are separated from each other.

The support member may include a core portion having a thickness greater than a distance from the first surface of the substrate to the second electrode and arranged on the substrate, and a shell portion surrounding the core portion.

The shell portion may include a cover part surrounding the core portion, and an extension part extending from a side surface of the cover part and connected to the second electrode.

The core portion and the shell portion may be formed of different materials.

The shell portion may be formed of the same material as that of the second electrode.

The core portion may be formed of a photosensitive material or a polymer material.

The second electrode may move towards or away from the first electrode according to application of a voltage.

When a voltage is applied to the second electrode, the second electrode may move toward the first electrode and, when the application of a voltage is discontinued, the second electrode may moves away from the first electrode to be returned to an original position.

The first electrode and the second electrode may be formed of a light blocking material.

The first electrode and the second electrode may be coated with a reflection material.

The micro optical switching device may further include an insulation layer that is arranged between the first electrode and the second electrode and which prevents an electric connection between the first electrode and the second electrode.

The insulation layer may be arranged in an area where the first electrode and the second electrode overlap each other.

The insulation layer may be arranged in at least one of an upper surface of the first electrode and a lower surface of the second electrode.

The insulation layer may include a first surface disposed on one of the lower surface of the second electrode and the upper surface of the first electrode, and a second surface, opposite the first surface, which is coated with a material for preventing adhesion to one of the first electrode or the second electrode.

An uneven surface may be formed on a surface of one of the first or second electrode that contacts or is detached from the insulation layer according to application of a voltage According to an aspect of another exemplary embodiment, an image display apparatus includes a backlight unit emitting light, and a display panel including a plurality of the above-mentioned micro optical switching devices and forming an image by controlling an amount of transmission of light emitted by the backlight unit.

The display panel may include an optical film that changes a proceeding path of light passing through the micro optical switching device.

The optical film may be arranged separately from the second electrode by the support member.

According to an aspect of another exemplary embodiment, a method of manufacturing a micro optical switching device includes forming a first electrode on an upper surface of a substrate, the first electrode including a first opening array including a plurality of first openings, depositing a first donor sacrificial layer on the substrate covering the first electrode, forming a sacrificial layer, which covers the first electrode, and a core portion arranged separately from the first electrode, by patterning the first donor sacrificial layer, depositing a conductive material covering the sacrificial layer and the core portion, forming a second electrode and a shell portion by patterning the conductive material, wherein the second electrode comprises a second opening array comprising a plurality of second openings which do not overlap with the plurality of first openings, and wherein the shell portion surrounds the core portion, and removing the sacrificial layer.

In the forming of the sacrificial layer and the core portion, the sacrificial layer and the core portion may be formed by etching part of the first donor sacrificial layer.

The forming of the sacrificial layer and the core portion may include forming the sacrificial layer and a first part of the core portion by patterning the first donor sacrificial layer, depositing a second donor sacrificial layer which covers the sacrificial layer and the first part of the core portion, and forming a second part of the core portion, disposed on the first part of the core portion, by patterning the second donor sacrificial layer.

The method may further include forming an insulation layer that prevents contact between the first electrode and the second electrode.

The insulation layer may be formed in an area where the first electrode and the second electrode overlap each other.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
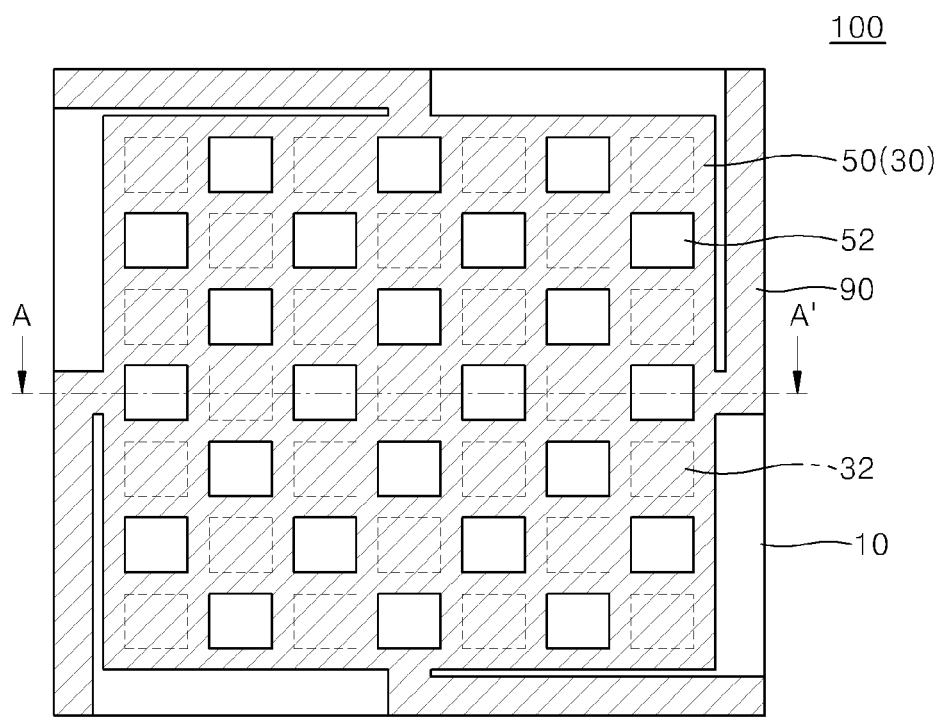
FIG. 1 is a plan view of a micro optical switching device according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
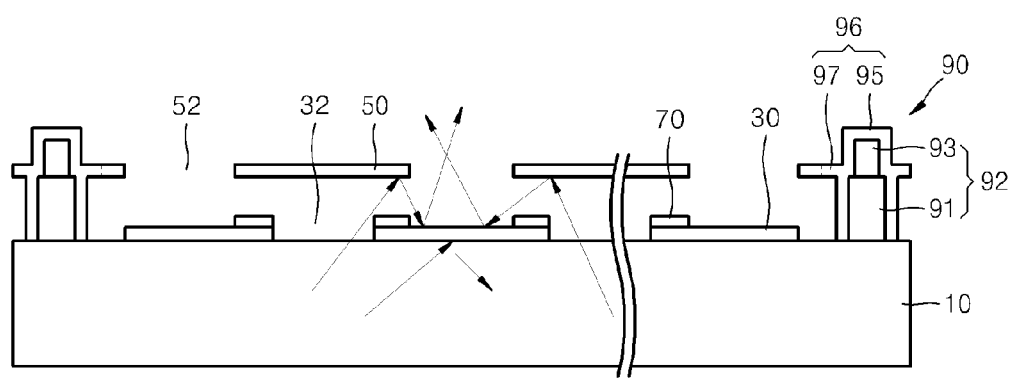
FIG. 2 is a cross-sectional view illustrating the micro optical switching device of FIG. 1 in an OFF state.
Figure 3:
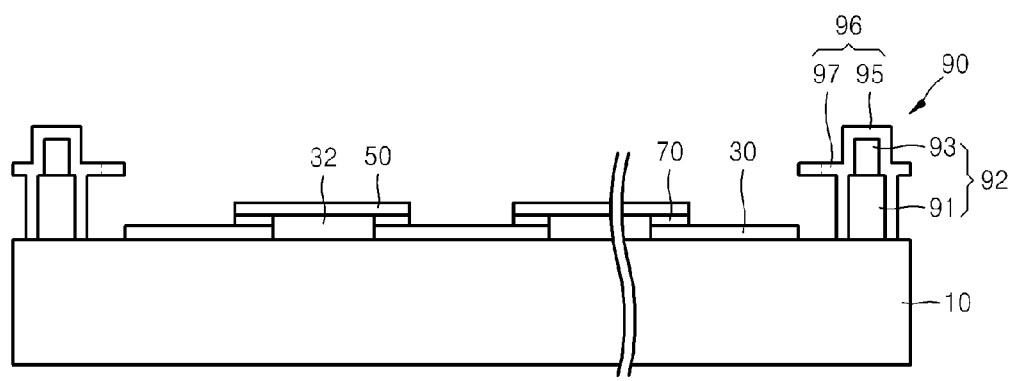
FIG. 3 is a cross-sectional view illustrating the micro optical switching device of FIG. 1 in an ON state.

FIG. 1 is a plan view of a micro optical switching device 100 according to an exemplary embodiment. FIG. 2 is a cross-sectional view illustrating the micro optical switching device 100 of FIG. 1 in an OFF state. FIG. 3 is a cross-sectional view illustrating the micro optical switching device 100 of FIG. 1 in an ON state.

Referring to FIGS. 1 to 3, the micro optical switching device 100 may include a first electrode 30 arranged on an upper surface of a substrate 10 and a second electrode 50 arranged to be separated from the first electrode 30, such that the second electrode is spaced above the first electrode and the upper surface of the substrate 10. The substrate 10 may be formed of a transparent amorphous material, for example, glass, to transmit light. The first and second electrodes 30 and 50 may be formed of a conductive material having a light-blocking property. The first and second electrodes 30 and 50 may be formed of, for example, a carbon nano-structure such as carbon nanotube (CNT) or graphene, conductive polymer such as polypyrrole, polyaniline, polyacetylene, polythiophene, polyphnylene vinylene, polyphenylene sulfide, poly p-phenylene, or polyheterocycle vinylene, a metal oxide such as indium tin oxide (ITO), aluminium zinc oxide (AZO), indium zinc oxide (IZO), Tin oxide ($SnO_2$), or $In_2O_3$, and a thin film with distributed metal nanoparticles such as Al, Cu, Au, or Ag. The first and second electrodes 30 and 50 may be additionally provided with a colored material such as a black material for blocking light so as to have a light-blocking property. Also, lower surfaces of the first and second electrodes 30 and 50 may be coated with a reflection material.

The first electrode 30 may include a first opening array having a plurality of openings 32. The second electrode 50 may include a second opening array having a plurality of openings 52. The first opening array and the second opening array are arranged such that the openings 32 and 52 do not overlap with each other. As the second electrode 50 moves close to or far from the first electrode 30, for example, in up/down motion, the micro optical switching device 100 may block or transmit light. Although in FIG. 1 the openings 32 and 52 included in the first and second opening arrays are illustrated as rectangular, the present disclosure is not limited thereto. The shape of an opening may be at least one of a circle, an oval, and a polygon. The size of each opening may be the same as or different from that of another opening.

The micro optical switching device 100 may further include an insulation layer 70 for preventing electric connection between the first and second electrodes 30 and 50. The insulation layer 70 may be formed of a material having a light-blocking property or an insulation material including at least one of $ZrO_2$, $TiO_2$, MgO, $CeO_2$, $Al_2O_3$, $HfO_2$, NbO, $SiO_2$, and $Si_3N_4$. The insulation layer 70 may be arranged between the first and second electrodes 30 and 50 in an area where the first and second electrodes 30 and 50 overlap each other. The insulation layer 70 may be arranged on an upper surface of the first electrode 30, as illustrated in FIGS. 2 and 3. However, the present disclosure is not limited thereto, and the insulation layer 70 may be arranged on a lower surface of the second electrode 50.

The micro optical switching device 100 may further include a support member 90 for supporting the second electrode 50 in a lifted position, spaced above the first electrode 30 by a predetermined gap. The support member 90 is provided on the substrate 10 and is connected with the second electrode 50. The thickness of the support member 90 may be determined according to the magnitude of a voltage to be applied to the first and second electrodes 30 and 50. For example, as the magnitude of an applied voltage increases, the thickness of the support member 90 may increase. The thickness of the support member 90 is greater than a sum of the thickness of the first electrode 30 and the thickness of the second electrode 50. As a result, the second electrode 50 may be lifted by the support member 90 from the first electrode 30 by a predetermined gap.

An upper portion of the support member 90 may protrude above the second electrode 50. Accordingly, the second electrode 50 may also be separated by a predetermined distance from constituent elements, for example, an optical film arranged above the micro optical switching device 100. Since the second electrode 50 is a thin film having a thin thickness, the second electrode 50 may become slightly warped due to an external impact or a change in temperature. Even when the second electrode 50 is slightly warped, since the support member 90 protrudes above the second electrode 50, the second electrode 50 may still remain separated from the constituent elements arranged above the micro optical switching device 100. In addition, even if the constituent elements arranged above the micro optical switching device 100 become deformed by an external force, since the constituent elements and the second electrode 50 are separated from each other, damage to the micro optical switching device 100 may be prevented.

The support member 90 is arranged laterally outside the first and second electrodes 30 and 50. Multiple support members 90 may be provided in to support the second electrode 50. When a plurality of support members 90 are provided, the support members 90 may be arranged symmetrically with respect to a center of the second electrode 50.

The support member 90, for example, may include a core portion 92 arranged on the substrate 10 and a shell portion 96 surrounding the core portion 92 and connected to the second electrode 50. The thickness of the core portion 92 may be greater than a distance from the substrate 10 to the second electrode 50. Accordingly, the second electrode 50 may be lifted by the core portion 92 from the first electrode 30 by a predetermined gap. Also, the core portion 92 may be divided into a first core part 91 arranged on the substrate 10 and a second core part 93 arranged above the first core part 91. A cross sectional area of the second core part 93 may be equal to or less than that of the first core part 91. The thickness of the second core part 93 may be the same as the distance from the substrate 10 to the second electrode 50. The first and second core parts 91 and 93 may be formed of the same material or different materials. For example, the core portion 92 may be formed of a photosensitive material, polymer, etc.

The shell portion 96 may include a cover part 95, surrounding the core portion 92, and an extension part 97, extending from a side surface of the cover part 95 and connected to the second electrode 50. Since the thickness of the core portion 92 is greater than the distance from the substrate 10 to the second electrode 50, the support member 90 protrudes above the second electrode 50. Thus, the extension part 97 extends from the side surface of the cover part 95 and is connected to the second electrode 50.

The shell portion 96 is connected to the second electrode 50 and is moved due to its engagement with the second electrode 50 and may be formed of an elastic material. For example, the support member 90 may be formed of an elastic conductive material or an elastic polymer. For example, the support member 90 may include polysiloxane, polyurethane, poly-silicon-polyurethane, rubber, ethylene-vinyl acetate copolymer, phenolic-nitrile rubber, styrene butadiene rubber, polyether-block-amide, and polyolefin, or any of various gels and other similar materials. For convenience of manufacture, the shell portion 96 may be formed of the same material as the second electrode 50 or a different material from the core portion 92.

The micro optical switching device 100 may be operated as explained below according to application of a voltage. When a voltage is not applied to the micro optical switching device 100, as illustrated in FIG. 2, the second electrode 50 of the micro optical switching device 100 is lifted from the first electrode 30 by the intrinsic elasticity of the support member 90. In this state, light input through the substrate 10 is output to the outside through the first opening array of the first electrode 30 and the second opening array of the second electrode 50. Since the first and second opening arrays are arranged such that the openings 32 and 52 do not overlap each other, part of the input light may directly pass through the first and second opening arrays or may be reflected by at least one of the first and second electrodes 30 and 50 and output to the outside, depending on the angle at which the light passes through the substrate.

However, when a voltage is applied to the micro optical switching device 100, as illustrated in FIG. 3, the second electrode 50 of the micro optical switching device 100 moves downward to contact the insulation layer 70 and the support member 90 expands according to the movement of the second electrode 50. Since the first and second opening arrays do not overlap with each other, the light input through the substrate 10 is reflected by the first and second electrodes 30 and 50 without passing therethrough.

When the application of a voltage is discontinued, as illustrated in FIG. 2, the support member 90 is returned to its original state. As such, as the second electrode 50 can be moved up and down by the application of a voltage, and input light may be alternately transmitted or blocked.

Although FIGS. 2 and 3 illustrate that light may be transmitted or blocked according to the application of a voltage, the present disclosure is not limited thereto. Since the range of the up/down movement of the second electrode 50 is controlled according to the magnitude of an applied voltage, an amount of light transmission may be controlled.

Figure 4:
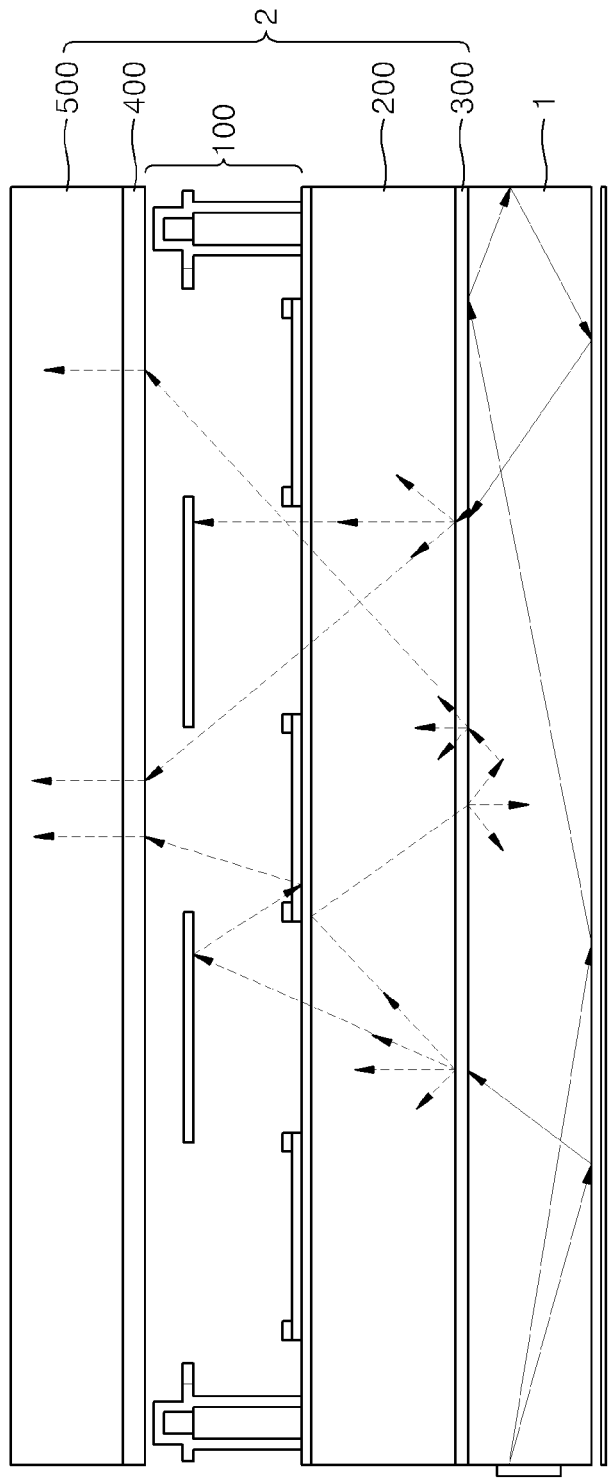
FIG. 4 is a cross-sectional view of an image display apparatus including the micro optical switching device, according to an exemplary embodiment.

The micro optical switching device 100 may be a constituent element of a display panel 2 of FIG. 4 that displays an image by blocking or transmitting light. FIG. 4 is a cross-sectional view of an image display apparatus including the micro optical switching device 100 according to an exemplary embodiment.

Referring to FIG. 4, the image display apparatus according to the present embodiment includes the display panel 2 including the micro optical switching device 100 surrounded by a first display panel 200 and a second display panel 500, and a backlight unit 1 disposed under the display panel 2.

The backlight unit 1 may include a light source and a waveguide plate as constituent elements for providing light to the display panel 2. The display panel 2 may include a diffusion plate 300 for diffusing light emitted by the backlight unit 1.

The display panel 2 may display an image by blocking or transmitting light provided by the backlight unit 1. The display panel 2 has a structure to control the amount of light transmission by using the micro optical switching device 100.

The micro optical switching device 100 of the display panel 2 is surrounded by the first and second display panels 200 and 500. The first and second display panels 200 and 500 are formed of glass to transmit light. The micro optical switching device 100 and an optical film 400 may be provided between the first and second display panels 200 and 500.

One optical switching device 100 may be arranged for each pixel. A variety of voltages may be applied to the micro optical switching device 100 and the amount of transmission of light is controlled as the second electrode 50 is moved up and down according to the applied voltage.

Part of the light provided by the backlight unit 1 may pass through the micro optical switching device 100 via the first opening array of the first electrode 30 and the second opening array of the second electrode 50, or part of the light may be reflected by the first electrode 30 or the second electrode 50. The reflected light is incident on the backlight unit 1 and reflected again by the backlight unit 1 to be input to the micro optical switching device 100 to be reused. Since the light that does not pass through the micro optical switching device 100 is reflected again by the backlight unit 1 to be input to the micro optical switching device 100, use of the micro optical switching device 100 may reduce consumption of power and increase optical efficiency.

The optical film 400 changes a proceeding path of the light input from the micro optical switching device 100 to be applied to the second display panel 500. The optical film 400 may include a prism, a diffusion panel, a polarized panel, etc. Since the support member 90 of the micro optical switching device 100 protrudes above the second electrode 50, the optical film 400, arranged above the micro optical switching device 100, is separated from the second electrode 50. Thus, even when the optical film 400 is slightly deformed, the optical film 400 and the second electrode 50 do not contact each other. The optical film 400 may not be one of the constituent elements of an image display apparatus and, in some cases, the second display panel 500 may be arranged above the micro optical switching device 100 without the optical film 400 therebetween. In this case, since the second display panel 500 and the micro optical switching device 100 are arranged to be separated from each other by the support member 90, the micro optical switching device 100 may be protected from deformation of the second display panel 500.

Although it is not illustrated in the drawings, wirings are formed on the first display panel 200 or the second display panel 500 to apply a signal to the micro optical switching device 100. Also, the second display panel 500 may include a black matrix (not shown) and a color filter (not shown). A black matrix prevents light other than the light used for displaying an image from proceeding in an upward direction. A color filter is arranged in units of pixels as a unit used for indicating an image. The black matrix is arranged between color filters to identify pixels. The color filter adds a sense of color to the light provided by the backlight unit 1. In general, red, green, and blue color filters are used.

A method of manufacturing the micro optical switching device 100, according to an exemplary embodiment, will now be described with reference to FIGS. 5A to 5K. FIGS. 5A to 5K sequentially illustrate a method of manufacturing a micro optical switching device, according to an exemplary embodiment.

Figure 5A:
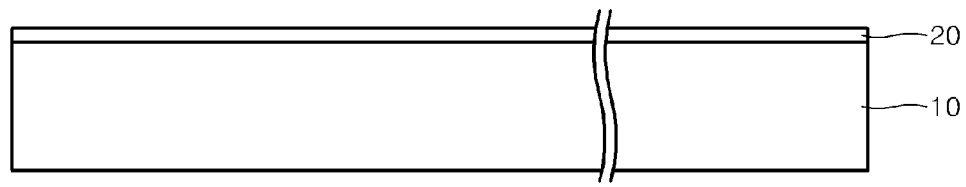
FIGS. 5A to 5K sequentially illustrate a method of manufacturing a micro optical switching device, according to an exemplary embodiment.

Referring to FIG. 5A, a first conductive material layer 20 having a light-blocking property is arranged on the substrate 10 that is transparent. The first conductive material layer 20 may be formed of a material that is opaque, has a low light transmissivity, and a high reflectivity. For example, a carbon nano-structure such as carbon nanotube (CNT) or graphene, conductive polymer such as polypyrrole, polyaniline, polyacetylene, polythiophene, polyphnylene vinylene, polyphenylene sulfide, poly p-phenylene, or polyheterocycle vinylene, a metal oxide such as indium tin oxide (ITO), aluminium zinc oxide (AZO), indium zinc oxide (IZO), Tin oxide ($SnO_2$), or $In_2O_3$, or a thin film with distributed metal nanoparticles such as Al, Cu, Au, or Ag may be formed on the substrate 10.

Figure 5B:
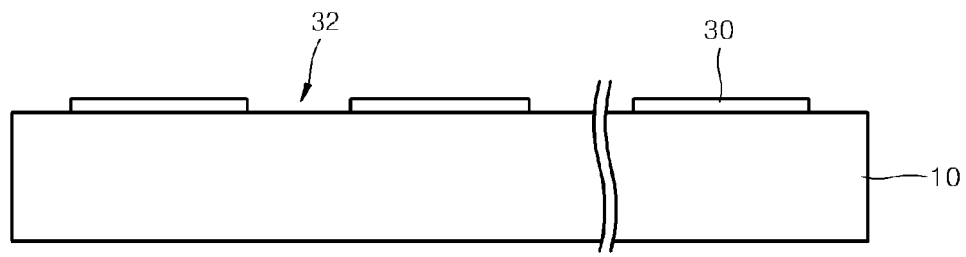
Figure 5C:
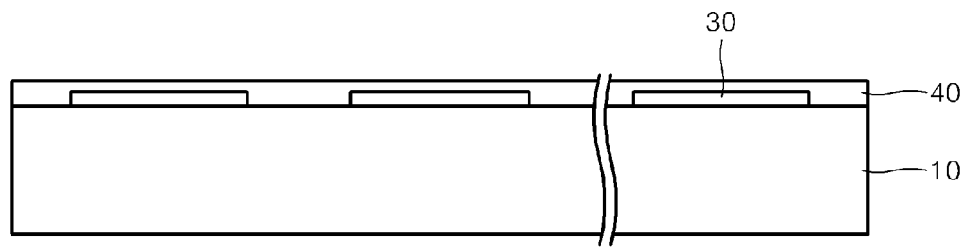
Figure 5D:
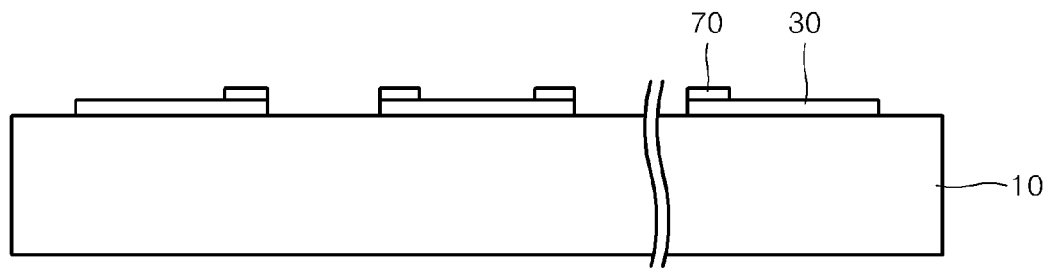

Also, referring to FIG. 5B, the first conductive material layer 20 is patterned to form the first electrode 30 including the first opening array having the openings 32. Referring to FIG. 5C, a donor insulation layer 40 is formed on the first electrode 30 and the substrate 10. The donor insulation layer 40 may be formed of a material having a light-blocking property or an insulation material including at least one of $ZrO_2$, $TiO_2$, MgO, $CeO_2$, $Al_2O_3$, $HfO_2$, NbO, $SiO_2$, and $Si_3N_4$. Referring to FIG. 5D, the donor insulation layer 40 is patterned to form the insulation layer 70 on areas of the first electrode 30. The insulation layer 70 may be formed on an entire upper surface of the first electrode 30 or on one or more partial areas thereof.

Figure 5E:
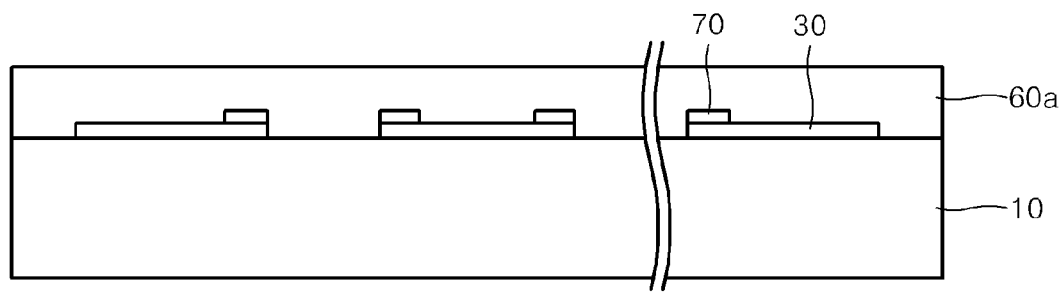
Figure 5F:
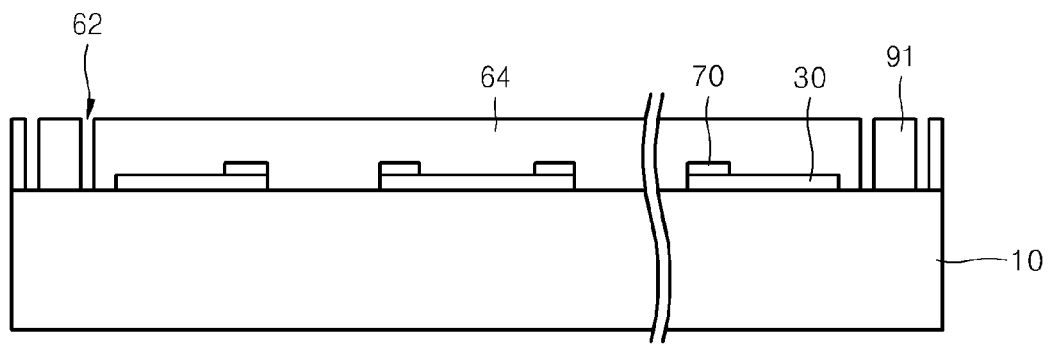

Referring to FIG. 5E, a first donor sacrificial layer 60a is formed on the substrate 10 to cover the first electrode 30 and the insulation layer 70. The first donor sacrificial layer 60a may be formed of solid powder having a property of chemically reacting to light and a photosensitive material such as a solvent that is volatile. The first donor sacrificial layer 60a may be formed of a polymer material. Referring to FIG. 5F, the first donor sacrificial layer 60a is patterned to form a first tube-type opening 62 that exposes part of the substrate 10. The first tube-type opening is formed outside the first electrode 30 to be separated from the first electrode 30. The first tube-type opening 62 may divide the first donor sacrificial layer 60a into a first sacrificial layer 64 and the first core part 91. The first sacrificial layer 64 and the first core part 91 undergo a hardening process.

Figure 5G:
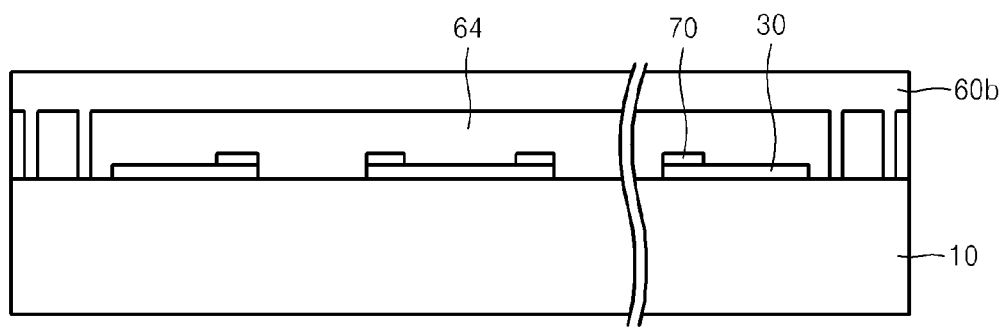
Figure 5H:
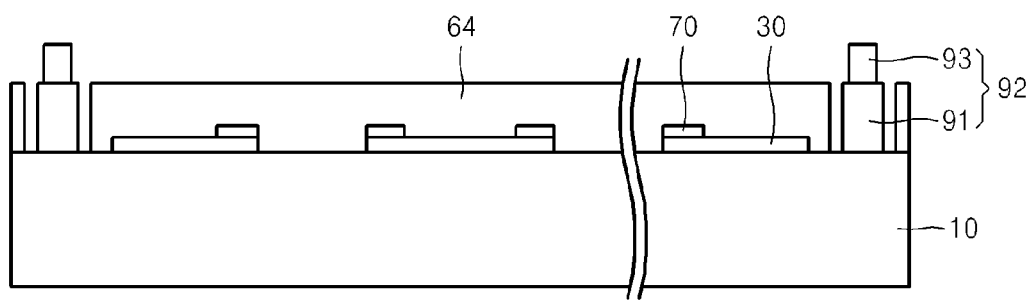

Then, referring to FIG. 5G, a second donor sacrificial layer 60b is formed on the substrate 10 to cover the first sacrificial layer 64 and the first core part 91. The second donor sacrificial layer 60b may be formed of a material that is the same as or different from that of the first donor sacrificial layer 60a. The second donor sacrificial layer 60b is patterned to form the second core part 93, as illustrated in FIG. 5H. In detail, the second donor sacrificial layer 60b is removed except for the second donor sacrificial layer 60b remaining on the first core part 91. The cross section of the second core part 93 may be equal to or less than that of the first core part 91. The first core part 91 and the second core part 93 together make the core portion 92.

Figure 5I:
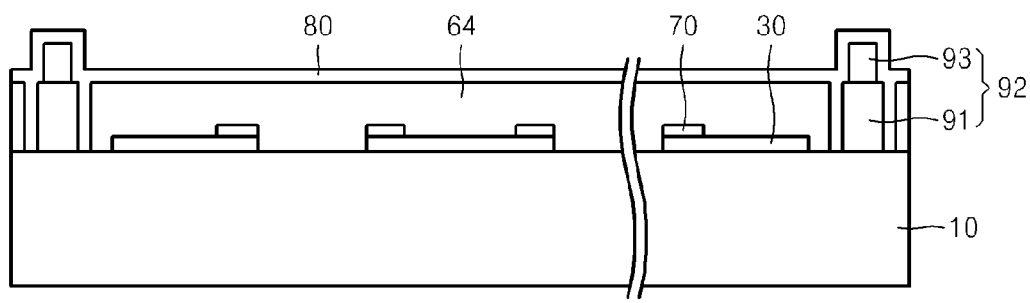
Figure 5J:
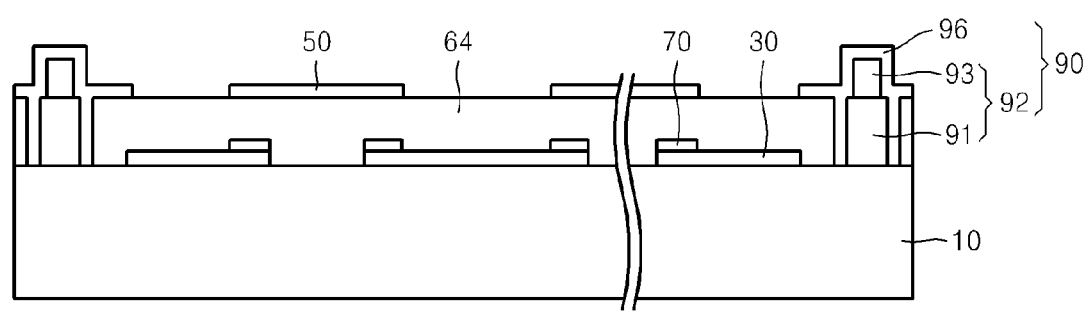

Referring to FIG. 5I, a second conductive material layer 80 is formed on the substrate 10 to cover the first sacrificial layer 64 and the core portion 92. The second conductive material layer 80 may be formed of an elastic conductive material. For example, the second conductive material layer 80 may be formed of a material that is the same as or different from that of the first conductive material layer 20. The second conductive material layer 80 is patterned to form the second electrode 50 and the shell portion 96, as illustrated in FIG. 5J. The second electrode 50 is formed by patterning a center area of the second conductive material layer 80 to form the second opening array including the openings 52 that does not overlap the first opening array. Also, when the second electrode 50 is formed, the center area of the second conductive material layer 80 may be patterned such that the insulation layer 70 may be arranged between the first conductive material layer 20 of the first electrode 30 and the second conductive material layer 80 of the second electrode 50. The support member 90 is formed by patterning the remaining part of the second conductive material layer 80. The support member 90 is formed by patterning a peripheral area of the second conductive material layer 80.

Figure 5K:
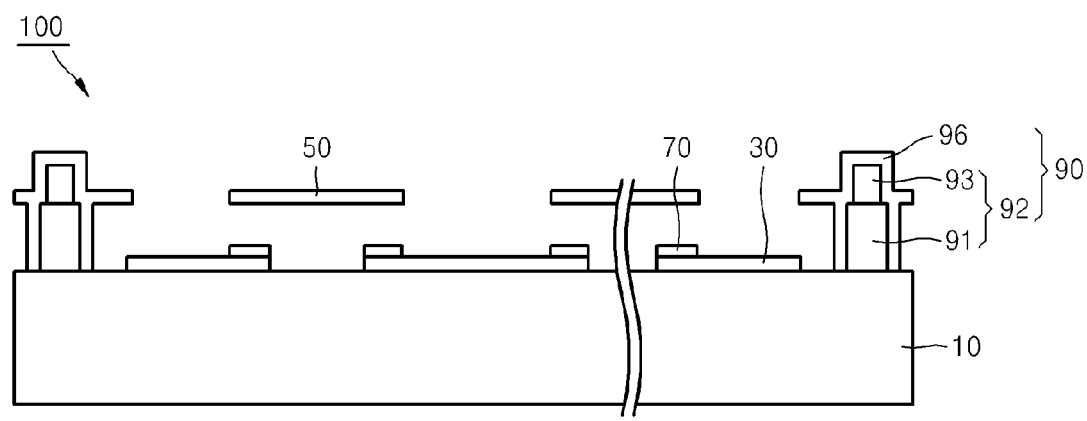

Finally, the first sacrificial layer 64 is removed and the micro optical switching device 100 is formed as illustrated in FIG. 5K. For example, the first sacrificial layer 64 may be removed by an ashing process.

The method of manufacturing a micro optical switching device by depositing a donor sacrificial layer is described above with reference to FIGS. 5A to 5K. However, the present disclosure is not limited thereto, and the micro optical switching device may be manufactured by etching donor sacrificial layer.

FIGS. 6A to 6H are reference views for explaining a method of manufacturing a micro optical switching device 110, according to another exemplary embodiment. The method of forming the first electrode 30 and the insulation layer 70 of the micro optical switching device 110 is the same as that of forming the first electrode 30 and the insulation layer 70 of the micro optical switching device 100 in FIGS. 5A to 5E.

Figure 6A:
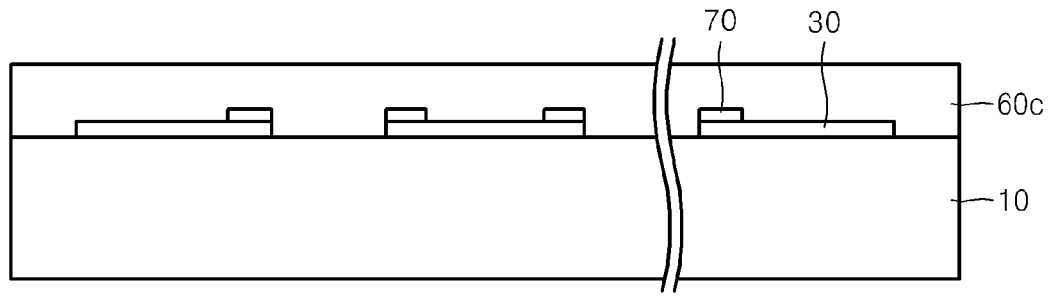
FIGS. 6A to 6H are reference views for explaining a method of manufacturing a micro optical switching device, according to another exemplary embodiment.

After forming the first electrode 30 and the insulation layer 70 thereon on the substrate 10, as illustrated in FIG. 6A, a third donor sacrificial layer 60c is formed on the substrate 10 to cover the first electrode 30 and the insulation layer 70. The third donor sacrificial layer 60c may be formed of a material that is the same as or different from that of the first and second donor sacrificial layer 60a and 60b. The thickness of the third donor sacrificial layer 60c may be the same as the sum of the thicknesses of the first and second donor sacrificial layers 60a and 60b.

Figure 6B:
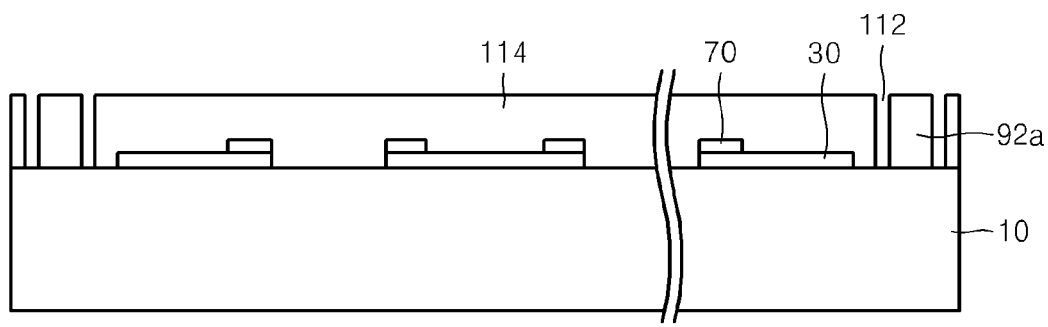

Referring to FIG. 6B, the third donor sacrificial layer 60c is patterned to form a second tube-type opening 112 that exposes part of the substrate 10. The second tube-type opening 112 is formed outside the first electrode 30 to be separated from the first electrode 30. The second tube-type opening 112 may divide the third donor sacrificial layer 60c into a third sacrificial layer 114 and the core portion 92a.

Figure 6C:
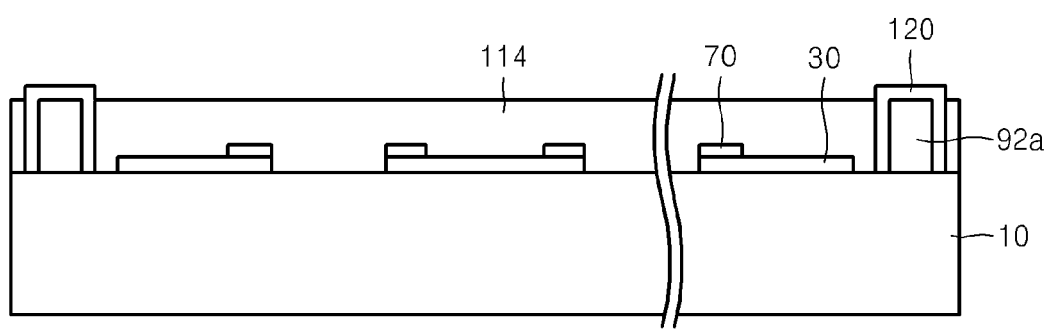

Referring to FIG. 6C, a mask layer 120 is formed on the substrate 10 to cover the core portion 92. The mask layer 120 may fill the second tube-type opening 112 and cover the core portion 92a. However, the present disclosure is not limited thereto. For example, a mask material is formed on the substrate 10 to cover the third sacrificial layer 114 and the core portion 92a and patterned so that the mask layer 120 surrounds the core portion 92a.

Figure 6D:
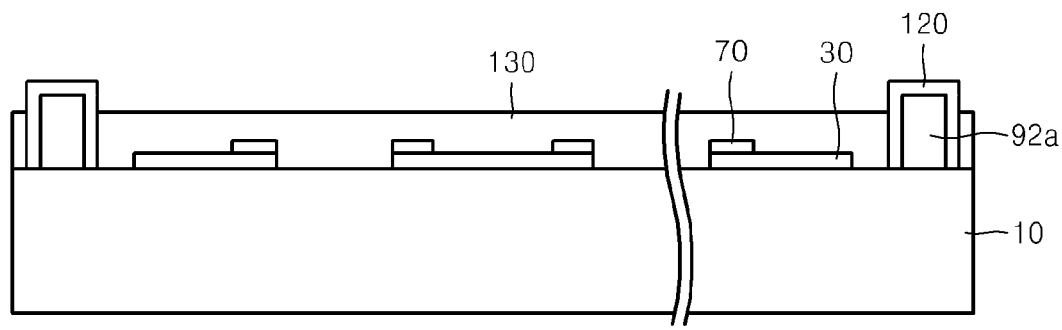
Figure 6E:
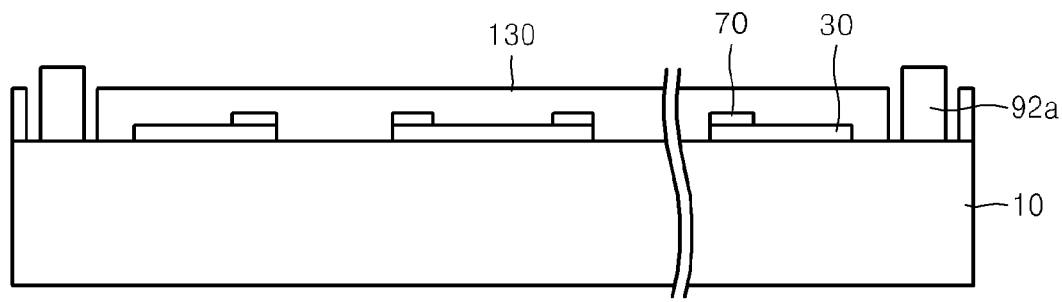

Referring to FIG. 6D, part of the third donor sacrificial layer 60c is etched. The third donor sacrificial layer 60c may be etched in a variety of methods. A layer after which part of the third donor sacrificial layer 60c is etched may be referred to as a third sacrificial layer 130. Then, the mask layer 120 is removed as illustrated in FIG. 6E.

Figure 6F:
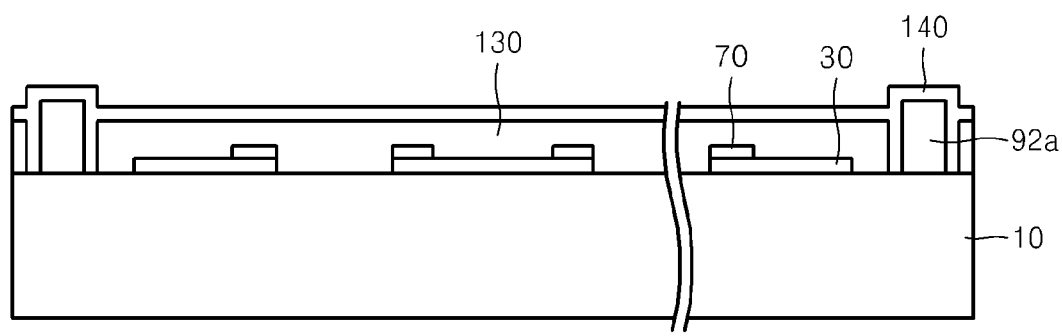
Figure 6G:
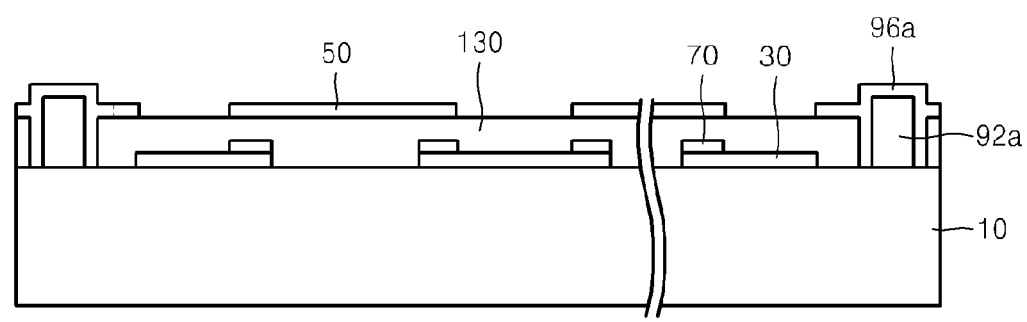
Figure 6H:
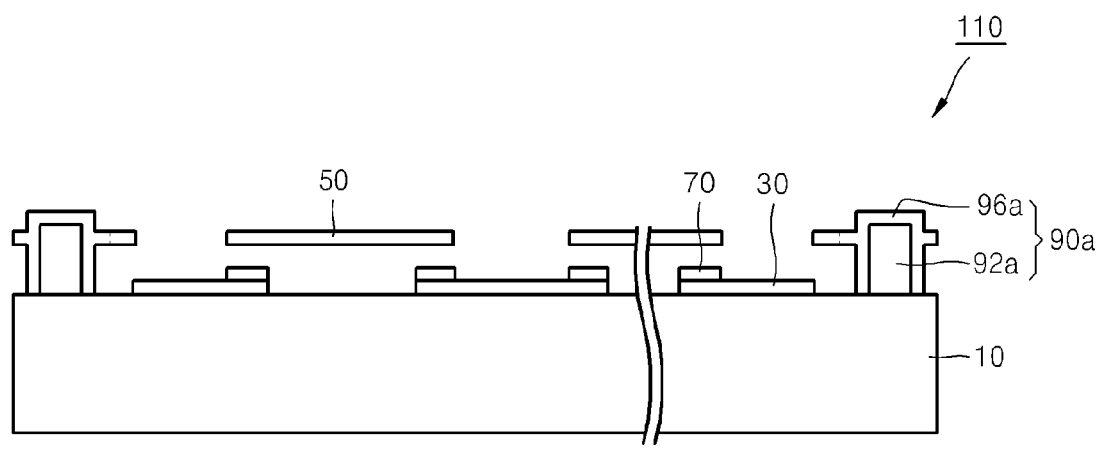

Referring to FIG. 6F, a third conductive material layer 140 is formed on the substrate 10 to cover the third sacrificial layer 130 and the core portion 92a. The third conductive material layer 140 may be formed of an elastic conductive material. For example, the third conductive material layer 140 may be formed of a material that is the same as or different from that of the first conductive material layer 20. The third conductive material layer 140 is patterned to form the second electrode 50 and the shell portion 96a, as illustrated in FIG. 6G. Finally, the third sacrificial layer 130 is removed and the micro optical switching device 110 is formed as illustrated in FIG. 6H. For example, the third sacrificial layer 130 may be removed by an ashing process.

In the present embodiment, although the insulation layer 70 is formed after the first electrode 30 is formed, the present disclosure is not limited thereto. The insulation layer 70 may be formed on an upper surface of the first electrode 30 or a lower surface of the second electrode 50. Also, in the present embodiment, although the support member 90 is formed of a material of the second conductive material layer 80, which is the same material as that of the second electrode 50, the present disclosure is not limited thereto. The support member 90 may be formed of a material different from that of the second conductive material layer 80, for example, an elastic polymer. As such, when the support member 90 is formed of a material different from the second electrode 50, the second electrode 50 may be formed after the support member 90 is formed or the support member 90 may be formed after the second electrode 50 is formed.

The second electrode 50 of the optical switching device 110 contacts or detaches from the insulation layer 70 according to the application of a voltage. To facilitate the contact/detachment between the insulation layer 70 and the second electrode 50, a material for preventing adhesion may be coated between the second electrode 50 and the insulation layer 70 or a lower surface of the second electrode 50 may be formed to be uneven to facilitate detachment.

Figure 7:
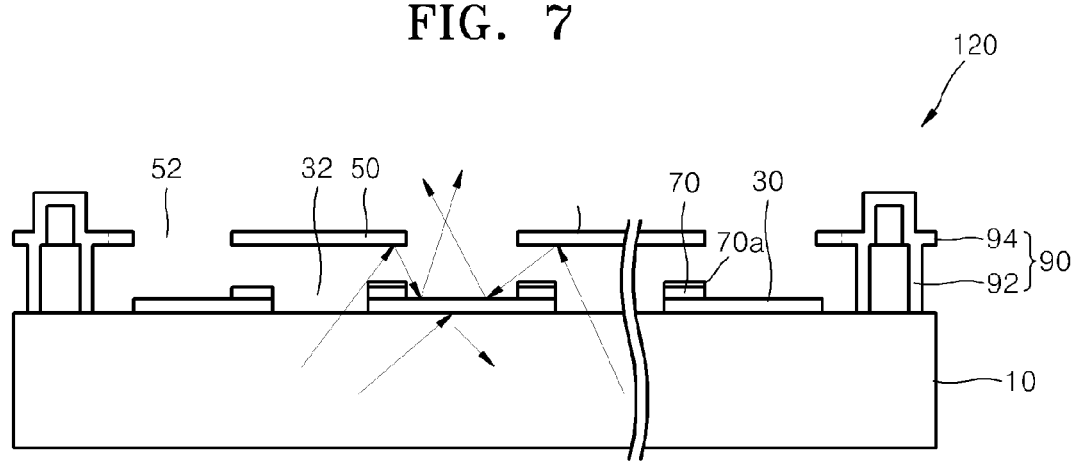
FIG. 7 is a cross-sectional view of a micro optical switching device according to another exemplary embodiment.
Figure 8:
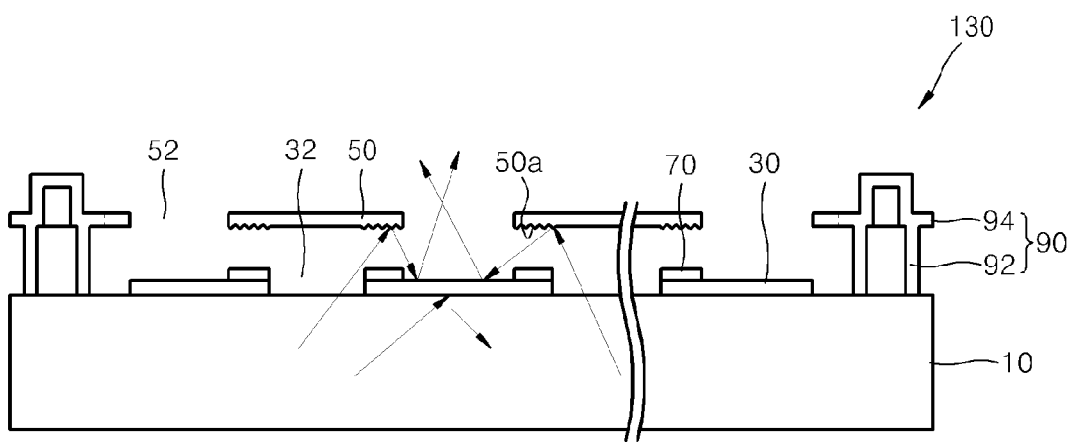
FIG. 8 is a cross-sectional view of a micro optical switching device according to another exemplary embodiment.

FIG. 7 is a cross-sectional view of a micro optical switching device 120 according to another exemplary embodiment. FIG. 8 is a cross-sectional view of a micro optical switching device 130 according to another exemplary embodiment.

Referring to FIG. 7, when a lower surface of the insulation layer 70 is arranged on an upper surface of the first electrode 30, a material layer 70a for preventing adhesion may be coated on an upper surface of the insulation layer 70. Although in FIG. 7 the material layer 70a for preventing adhesion is arranged on the insulation layer 70, the present disclosure is not limited thereto. The material layer 70a for preventing adhesion may be arranged on a lower surface of the second electrode 50. When the insulation layer 70 is arranged on the lower surface of the second electrode 50, the material layer 70a for preventing adhesion may be arranged on the lower surface of the insulation layer 70 or on the upper surface of the first electrode 30.

Referring to FIG. 8, an uneven portion 50a that reduces a contact area between the insulation layer 70 and the second electrode 50 may be formed on the second electrode 50 of the micro optical switching device 130. The uneven portion 50a may be formed over the entire lower surface of the second electrode 50 or only in an area of the lower surface of the second electrode 50 corresponding to the insulation layer 70. Also, the uneven portion 50a may be formed on the upper surface of the insulation layer 70. When the insulation layer 70 is arranged on the lower surface of the second electrode 50, the uneven portion 50a may be formed on the lower surface of the insulation layer 70 or on the upper surface of the first electrode 30.

The above-described support member 90 of each of the micro optical switching devices 100, 110, 120, and 130 not only supports the second electrode 50 but also supports each optical switching device by protruding above the second electrode 50 so as to separate each optical switching device from other adjacent constituent elements. However, the present disclosure is not limited thereto. The support member 90 may be divided into an electrode support member 98 for supporting the second electrode 50 and a device support member 99 for supporting a micro optical switching device.

Figure 9:
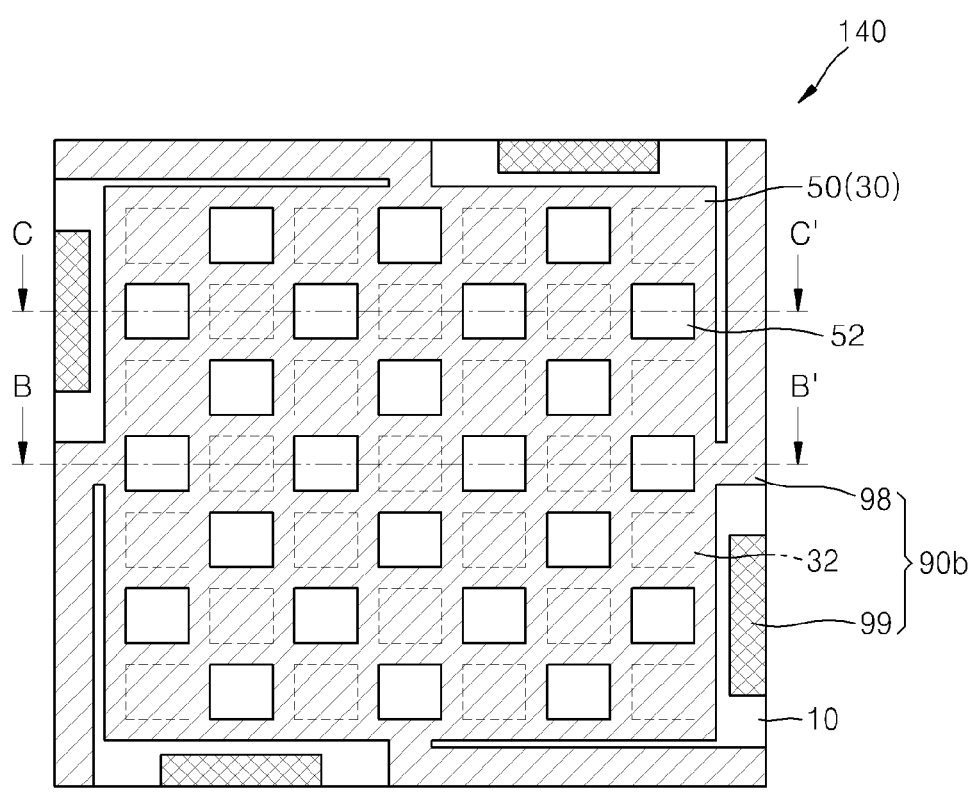
FIG. 9 is a plan view of a micro optical switching device according to another exemplary embodiment.
Figure 10A:
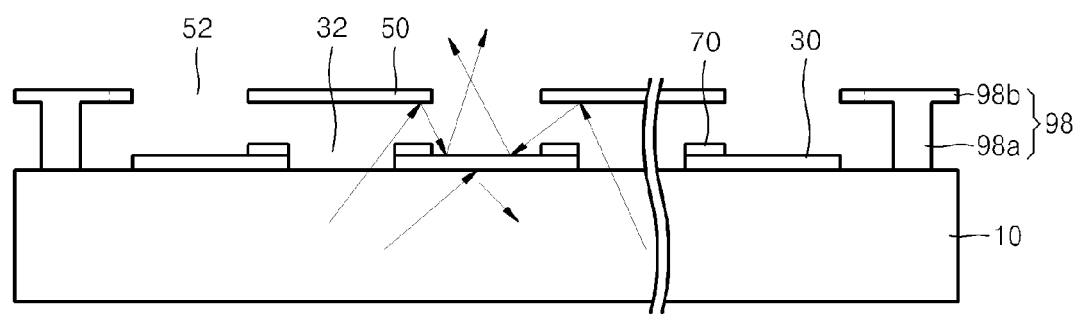
FIG. 10A is a cross-sectional view taken along line B-B' of the micro optical switching device of FIG. 9.
Figure 10B:
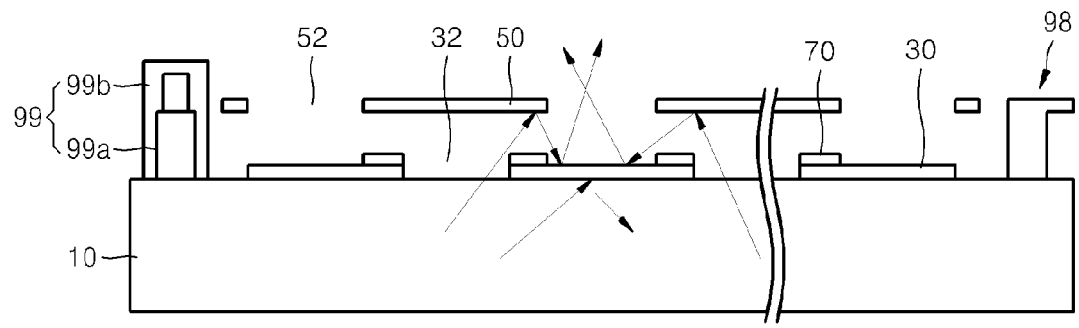
FIG. 10B is a cross-sectional view taken along line C-C' of the micro optical switching device of FIG. 9.

FIG. 9 is a plan view of a micro optical switching device 140 according to another exemplary embodiment of the present disclosure. FIG. 10A is a cross-sectional view taken along line B-B' of the micro optical switching device 140 of FIG. 9. FIG. 10B is a cross-sectional view taken along line C-C' of the micro optical switching device 140 of FIG. 9.

Referring to FIGS. 9, 10A, and 10B, a support member 90b may be arranged on the substrate 10 and may include the electrode support member 98 for supporting the second electrode 50 and the device support member 99 for supporting the micro optical switching device 140. When the support member 90b is divided into an electrode support member 98 and a device support member 99, the device support member 99 supports the micro optical switching device 140 regardless of the operation of the micro optical switching device 140 so that the stability of the micro optical switching device 140 may be further improved. The device support member 99 may be formed on the substrate 10 in an area where the first and second electrodes 30 and 50 are not formed, to protrude above the second electrode 50.

The electrode support member 98 may extend from the second electrode 50 to be connected to the substrate 10. For example, the electrode support member 98 may include a first electrode support member 98a arranged on the substrate 10 to be separated from the first electrode 30 and a second electrode support member 98b arranged on the first electrode support member 98a and connected to the second electrode 50.

The electrode support member 98 may be arranged outside the first and second electrodes 30 and 50. Also, a plurality of electrode support members 98 may be provided to support the second electrode 50. When a plurality of electrode support members 98 are provided, the electrode support members 98 may be arranged symmetrically with respect to the center of the second electrode 50. The electrode support member 98 may be formed of an elastic material, for example, an elastic conductive material or an elastic polymer. For convenience of manufacture, the electrode support member 98 may be formed of the same material as that of the second electrode 50. However, the present disclosure is not limited thereto. The electrode support member 98 may be formed of an elastic polymer having a large elasticity.

An upper portion of the device support member 99 may protrude above the second electrode 50. Accordingly, the second electrode 50 and the constituent elements arranged above the micro optical switching device 140 may be separated from each other by a predetermined gap. Since the second electrode 50 is a thin film having a small thickness, the second electrode 50 may become slightly warped due to an external impact or a change in temperature. Even when the second electrode 50 is slightly warped, since the device support member 99 protrudes above the second electrode 50, so that the second electrode 50 does not contact the constituent elements arranged above the micro optical switching device 140. In addition, even when the constituent elements, for example, an optical film or a cover, arranged above the micro optical switching device 140 are deformed by an external force, since the constituent elements and the second electrode 50 are separated from each other, damage to the micro optical switching device 140 may be prevented.

The device support member 99 is arranged outside the first and second electrodes 30 and 50. A plurality of device support members 99 may be provided to support the micro optical switching device 140. When a plurality of device support members 99 are provided, the device support members 99 may be arranged symmetrically with respect to the center of the second electrode 50.

The device support member 99 may include a core portion 99a arranged on the substrate 10 and a shell portion 99b surrounding the core portion 99a. The thickness of the device support member 99 may be greater than a distance from the substrate 10 to the second electrode 50. The core portion 99a may be formed of a photosensitive material, polymer, etc. The shell portion 99b may be formed of the same material as that of the second electrode 50.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A micro optical switching device comprising:
   a substrate;
   a first electrode, disposed on an upper surface of the substrate, the first electrode comprising a first opening array comprising a plurality of first openings;
   a second electrode, disposed over the first electrode, the second electrode comprising a second opening array comprising a plurality of second openings, wherein the plurality of second openings do not overlap with the plurality of first openings;
   a spacer disposed in a region in which the first electrode and the second electrode overlap with each other; and
   a support member, disposed on the substrate, wherein a thickness of the support member is greater than a distance from the upper surface of the substrate to the second electrode, and wherein a portion of the support member protrudes above the second electrode,
   wherein the second electrode is configured to move in a direction perpendicular to a plane of the first electrode based on a voltage applied to the micro optical switching device, such that, in a closed position, the second electrode and the first electrode contact the spacer, thereby blocking light from passing between the first electrode and the second electrode, and in an open position, one of the second electrode and the first electrode detaches from the spacer, thereby allowing light to pass between the first electrode and the second electrode.

2. The micro optical switching device of claim 1, wherein the support member supports the second electrode above the first electrode, such that the first electrode and the second electrode are separated from each other.

3. The micro optical switching device of claim 1, wherein the support member comprises:
   a core portion, disposed on the substrate, having a thickness greater than a distance from the upper surface of the substrate to the second electrode; and
   a shell portion surrounding the core portion.

4. The micro optical switching device of claim 3, wherein the shell portion comprises:
   a cover part surrounding the core portion; and
   an extension part extending from a side surface of the cover part and connected to the second electrode.

5. The micro optical switching device of claim 3, wherein the core portion and the shell portion are formed of different materials.

6. The micro optical switching device of claim 3, wherein the shell portion is formed of the same material as that of the second electrode.

7. The micro optical switching device of claim 3, wherein the core portion is formed of one of a photosensitive material and a polymer material.

8. The micro optical switching device of claim 1, wherein, when a voltage is applied to the second electrode, the second electrode moves in a downward direction such that the second electrode contacts the spacer disposed on the first electrode and, when the application of a voltage is discontinued, the second electrode moves in an upward direction such that the second electrode is separated from the spacer disposed on the first electrode.

9. The micro optical switching device of claim 1, wherein the first electrode and the second electrode are formed of a light blocking material.

10. The micro optical switching device of claim 1, wherein the first electrode and the second electrode are coated with a reflection material.

11. The micro optical switching device of claim 1, wherein the spacer comprises an insulation layer, disposed between the first electrode and the second electrode, which prevents an electric connection between the first electrode and the second electrode.

12. The micro optical switching device of claim 11, wherein the insulation layer is disposed on at least one of an upper surface of the first electrode and a lower surface of the second electrode.

13. The micro optical switching device of claim 11, wherein the insulation layer comprises:
   a first surface disposed on one of the lower surface of the second electrode and the upper surface of the first electrode; and
   a second surface, opposite the first surface, which is coated with a material for preventing adhesion to one of the first electrode and the second electrode.

14. The micro optical switching device of claim 11, wherein an uneven surface is formed on a surface of one of the first or second electrode that faces the insulation layer.

15. An image display apparatus comprising:
   a backlight unit which emits light; and
   a display panel comprising a plurality of the micro optical switching devices of claim 1, wherein the display panel forms an image by controlling transmission of light emitted by the backlight unit.

16. The micro optical switching device of claim 15, wherein the display panel comprises an optical film that changes a proceeding path of light passing through the micro optical switching device.

17. The micro optical switching device of claim 16, wherein the optical film is separated from the second electrode by the support member.

18. A method of manufacturing a micro optical switching device, the method comprising:
   forming a first electrode on an upper surface of a substrate, the first electrode comprising a first opening array comprising a plurality of first openings;
   forming a spacer on the first electrode;
   depositing on a first donor sacrificial layer on the substrate, wherein the first donor sacrificial layer covers the first electrode and the spacer;
   forming a sacrificial layer, which covers the first electrode, and a core portion arranged separately from the first electrode, by patterning the first donor sacrificial layer;
   depositing a conductive material covering the sacrificial layer and the core portion;
   forming a second electrode and a shell portion by patterning the conductive material, wherein the second electrode comprises a second opening array comprising a plurality of second openings which do not overlap with the plurality of first openings, and wherein the shell portion surrounds the core portion; and
   removing the sacrificial layer,
   wherein the spacer is disposed in a region in which the first electrode and the second electrode overlap with each other, and the second electrode is configured to move in a direction perpendicular to a plane of the first electrode based on a voltage applied to the micro-optical switching device, such that, in a closed position, the second electrode and the first electrode contact the spacer, thereby blocking light from passing between the first electrode and the second electrode, and in an open position, one of the second electrode and the first electrode detaches from the spacer, thereby allowing light to pass between the first electrode and the second electrode.

19. The method of claim 18, wherein, the patterning the first donor sacrificial layer comprises etching part of the first donor sacrificial layer.

20. The method of claim 18, wherein the forming the sacrificial layer and the core portion comprises:
   forming the sacrificial layer and a first part of the core portion, by patterning the first donor sacrificial layer;
   depositing a second donor sacrificial layer which covers the sacrificial layer and the first part of the core portion; and
   forming a second part of the core portion, disposed on the first part of the core portion, by patterning the second donor sacrificial layer.

21. The method of claim 18, wherein the forming the spacer comprises forming an insulation layer that prevents contact between the first electrode and the second electrode.

* * * * *